United States Patent
Roy et al.

(10) Patent No.: US 10,155,664 B2
(45) Date of Patent: Dec. 18, 2018

(54) PROCESS FOR SYNTHESIZING HYBRID BIFUNCTIONALIZED MULTIWALLED CARBON NANOTUBES AND APPLICATIONS THEREOF

(71) Applicant: Director General, Defence Research & Development Organisation, New Delhi (IN)

(72) Inventors: Debmalya Roy, Kanpur (IN); Babita Shastri, Kanpur (IN); Kingsuk Mukhopadhyay, Kanpur (IN); Arvind Kumar Saxena, Kanpur (IN)

(73) Assignee: Director General, Defense Research & Development Organisation, New Delhi (IN)

( * ) Notice: Subject to any disclaimer, the term of this patent is extended or adjusted under 35 U.S.C. 154(b) by 804 days.

(21) Appl. No.: 14/378,291

(22) PCT Filed: Oct. 31, 2012

(86) PCT No.: PCT/IN2012/000719
§ 371 (c)(1),
(2) Date: Aug. 12, 2014

(87) PCT Pub. No.: WO2014/030169
PCT Pub. Date: Feb. 27, 2014

(65) Prior Publication Data
US 2015/0151971 A1    Jun. 4, 2015

(30) Foreign Application Priority Data

Aug. 23, 2012  (IN) .......................... 2621/DEL/2012

(51) Int. Cl.
| | |
|---|---|
| *B32B 9/00* | (2006.01) |
| *C01B 31/02* | (2006.01) |
| *B82Y 30/00* | (2011.01) |
| *B82Y 40/00* | (2011.01) |
| *C08K 9/06* | (2006.01) |

(Continued)

(52) U.S. Cl.
CPC .......... *C01B 31/0253* (2013.01); *B82Y 30/00* (2013.01); *B82Y 40/00* (2013.01);
(Continued)

(58) Field of Classification Search
CPC .. Y10T 428/30; C01B 31/022–31/0293; Y10S 977/742; B82Y 30/00
(Continued)

(56) References Cited

U.S. PATENT DOCUMENTS

2005/0186378 A1* 8/2005 Bhatt ................ B82Y 10/00
                                                    428/36.9
2006/0175952 A1* 8/2006 Lee .................. B82Y 10/00
                                                    313/311

(Continued)

OTHER PUBLICATIONS

Wang et al., "Preparation and Thermal Properties of Grafted CNTs Composites," *J. Mater. Sci. Technol.* 27(3): 233-238, 2011.

*Primary Examiner* — Daniel H Miller
(74) *Attorney, Agent, or Firm* — Seed IP Law Group LLP

(57) ABSTRACT

The present disclosure provides a process for synthesizing functionalized multi-walled carbon nanotubes (MWCNTs), comprising: refluxing MWCNTs with an acidic mixture to obtain a acid functionalized MWCNTs; and reacting the acid functionalized MWCNTs with oleyl amine in presence of an organic solvent to obtain an oleylamine derivative of MWCNTs. The present disclosure also provides a process for synthesizing a polycarbosilane coated MWCNT, comprising: mixing polycarbosilane and MWCNTs to obtain a mixture; stirring the mixture in Tetrahydrofuran, in presence of a catalyst under an inert atmosphere, to obtain a reaction mixture; and drying the reaction mixture under vacuum followed by heating to obtain polycarbosilane coated MWCNT's. The present disclosure further provides the application of functionalized MWCNTs as synthesized in accordance with the present disclosure, for use in making (Continued)

photovoltaic devices and the application of polycarbosilane coated MWCNTs as synthesized in accordance with the present disclosure for use in making glass fiber reinforced epoxy composites.

12 Claims, 1 Drawing Sheet

(51) Int. Cl.
    *C01B 32/152* (2017.01)
    *C01B 32/168* (2017.01)
    *C01B 32/174* (2017.01)

(52) U.S. Cl.
    CPC .......... *C01B 32/152* (2017.08); *C01B 32/168* (2017.08); *C01B 32/174* (2017.08); *C08K 9/06* (2013.01); *C01B 2202/06* (2013.01); *Y10T 428/2995* (2015.01)

(58) Field of Classification Search
    USPC ................................ 428/408; 423/447.1, 448
    See application file for complete search history.

(56) References Cited

U.S. PATENT DOCUMENTS

| | | | |
|---|---|---|---|
| 2007/0289625 A1* | 12/2007 | Demadrille | B82Y 10/00 136/263 |
| 2009/0060815 A1* | 3/2009 | Wong | B82Y 30/00 423/324 |
| 2010/0143701 A1* | 6/2010 | Zhu | B29C 70/081 428/323 |
| 2012/0183770 A1 | 7/2012 | Bosnyak et al. | |
| 2013/0261221 A1* | 10/2013 | Bosnyak | B60C 1/00 523/155 |

\* cited by examiner

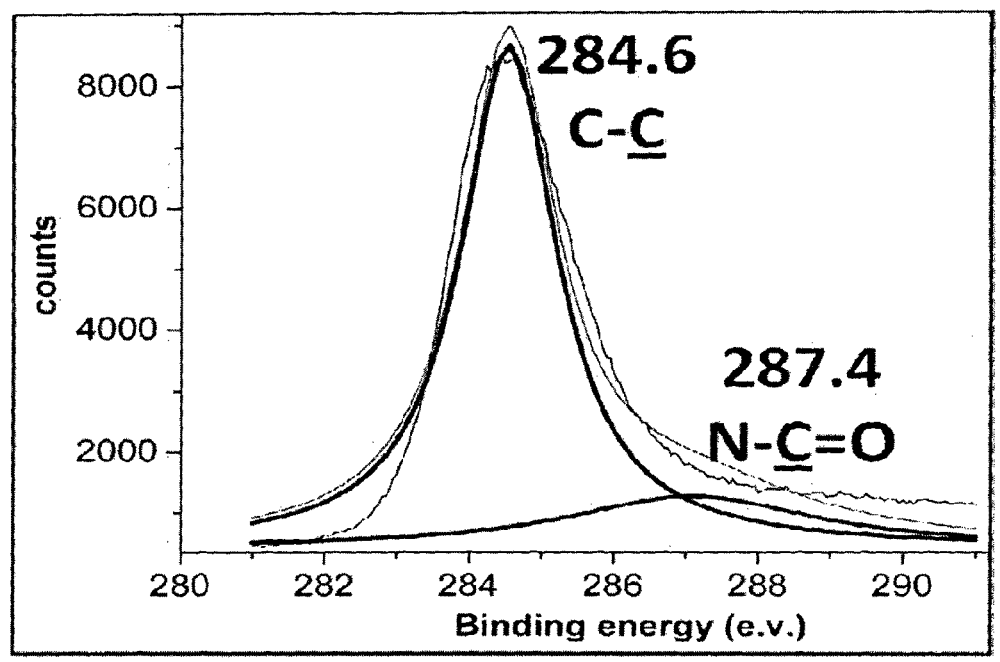

PROCESS FOR SYNTHESIZING HYBRID BIFUNCTIONALIZED MULTIWALLED CARBON NANOTUBES AND APPLICATIONS THEREOF

TECHNICAL FIELD

The present disclosure relates to a process for preparation of covalent functionalized multi-walled carbon nanotubes (MWCNTs) on which polycarbosilane is coated by noncovalent route.

The present disclosure also relates to the application of functionalized PCBM analog of multi-walled carbon nanotubes in preparation of photovoltaic devices. The present disclosure further relates to the application of multi-walled carbon nanotubes (MWCNT's) with hybrid organic inorganic functional group in preparation of glass fiber reinforced epoxy composites.

BACKGROUND

Carbon nanotubes (CNTs) were first synthesized and reported by Prof. S. Iijima of NEC Corporation, Japan in Nature 354, 56-58, 1991, and the polymer nanocomposites using carbon nanotube as filler were first reported by Prof. P. Ajayan et al. in Science, 265, 1212-1214, 1994. One graphene layer folds along the axis produces single walled carbon nanotubes (SWCNT) whereas many graphene layers wrapped onto themselves makes multi walled carbon nanotube (MWCNT). Carbon nanotubes (CNTs) are a novel crystalline form of carbon and the scientific community across the world soon realized experimentally and theoretically the CNT's unique atomic structure and properties, such as, high flexibility, low mass density, high aspect ratio, high strength-to-weight ratio, and extraordinary electrical, thermal, mechanical properties. J. P. Lu, in *Physical Review Letters*, 79, 1297-1300, 1997 and E. W. Wong et al in Science, 277, 1971-1975, 1997 has reported that the axial elastic modules and tensile strength of SWCNTs are theoretically and experimentally predicted to be as high as 1-2 TPa and 200 GPa respectively. Although the physical and chemical properties of SWCNT's are much superior to MWCNTs, however MWCNTs are widely used for application purpose due to their relatively low production cost and availability in large quantity.

E. T. Thostensona et al in *Composites Science and Technology*, 61, 1899-1912, 2001. has reported that the large surface area, high modules and strength of CNTs make them a good candidate for reinforcing host matrixes like polymer, ceramic or metal. Recent experimentations have shown remarkable enhancements in mechanical strength of composite with an addition of small amounts of CNTs, however, there are several challenges that are still need to be overcome in order to achieve the full potentials of CNT based composites as reported by R. Andrews et al, in *Current Opinion in Solid State and Materials Science*, 8, 31-37, 2004. The three critical issues of the CNT based composites are the uniform dispersion of CNTs in the host matrix material, the second is the proper interaction between the CNT and the host matrix and the third is the alignment of CNTs within the matrix. To achieve the distribution of CNTs in the matrix, the modification of the surface of CNTs is required either by covalent or noncovalent functionalization. For the proper interactions between the CNT and the host matrix the judicious choice of functional group on the CNT surface is critical.

S. Banerjee et al in *Advance Materials*, 17, 17-29, 2005 has reported that the chemical functionalization of CNTs allows the surface modification of carbon nanotube by introducing different functional groups for the better dispersion in organic solvent. Generally, CNTs are chemically modified either by covalently attach the functional group to the CNT surface or by wrapping polar/nonpolar molecules on the surface of the CNT by noncovalent interactions. Covalent functionalization of CNTs is very effective to enhance the proper dispersion of CNTs in the matrix, however, the covalent bonding inevitably disrupt the long range $\pi$ conjugation along the CNT axis, leading to the defects on the CNT side walls. Covalent functionalization seriously affects the electrical properties as well as mechanical properties of CNT. Consequently by keeping the CNTs structure intact, the use of noncovalent interactions such as $\pi$-$\pi$ interactions, van der Waals interactions and static charge interaction have been attempted to wrap the different molecules and polymers on CNTs surface for the proper distribution in the host matrix. However, it is realized that not only the distribution, the interaction of the attached moieties over CNTs with the host matrix is utmost important for achieving higher mechanical strengths. Therefore, the choice of functional group in both covalent and noncovalent derivatives' of MWCNTs is critical to achieve high reinforcement effect.

Jifen Wang et al in Journal of material Science technology, 2011, 27 (3), 233-238 disclosed the preparation of oleylamine derivative or oleylamine grafted of MWCNTs by process that involves: treating MWCNTs with nitric and sulphuric acids followed by a treatment with $SOCl_2$ (containing dimethylformamide (DMF)) to covert the —COOH groups to —COCl and treating the resulting sample with oleylamine to obtain oleylamine derivative of MWCNTs. The oleylamine groups in the functionalized multi walled carbon nanotube (MWCNT) prepared by this process are mostly non-covalently coated on MWCNTs. Further, the acids used in this process are concentrated acids that damage the structure of MWCNTs. The oleylamine coating on MWCNTs prepared by this process would easily come out during sonication in organic solvents and thus the applications of these MWCNTs are restricted.

There are several covalent derivatives of MWCNTs schemes available in the literature, which produced functionalized nanotubes that can be distributed in the polymer/resin matrixes. However, the enhancement of mechanical strength of the composite is not always showed desired results due to the improper reinforcement.

Thus there is a need for a process by which the functionalized MWCNTs can be synthesized in which the functional group is covalently attached to MWCNTs surface.

SUMMARY

The present disclosure relates to a process for synthesizing functionalized multi-walled carbon nanotubes (MWCNTs), comprising: refluxing multi-walled carbon nanotubes with an acidic mixture of sulphuric acid, nitric acid and deionized water to obtain a acid functionalized multi-walled carbon nanotubes; and reacting the acid functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

The present disclosure also relates to a process for synthesizing a polycarbosilane coated multi-walled carbon nanotubes (MWCNT's), comprising: mixing polycarbosilane and multi-walled carbon nanotubes (MWCNT's) in a ratio range of 1:2 to 1:4 to obtain a mixture; stirring the mixture in Tetrahydrofuran (THF) at a temperature in the range of 50 deg C. to 65 deg C. for a time period in the range of 6 hours to 12 hours, in presence of a catalyst under an inert atmosphere, to obtain a reaction mixture; and drying the reaction mixture under vacuum followed by heating at a temperature in the range of 430 deg C. to 460 deg C., in 0.1 mbar vacuum for a time period in the range of 4 hours to 6 hours to obtain polycarbosilane coated multi-walled carbon nanotubes (MWCNT's).

The present disclosure further relates to a functionalized multi-walled carbon nanotube as synthesized in accordance with the present disclosure, for use in making photovoltaic devices.

The present disclosure also relates to a polycarbosilane coated of multi-walled carbon nanotube, preferably oleyamine derivative of multi-walled carbon nanotube, as synthesized in accordance with the present disclosure for use in making glass fiber reinforced epoxy composites.

These and other features, aspects, and advantages of the present subject matter will become better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF THE DRAWINGS

The above and other features, aspects, and advantages of the subject matter will be better understood with regard to the following description, and accompanying drawings where:

FIG. 1 shows the X-ray photoelectron spectrograph of the oleylamine derivative of multi-walled carbon nanotubes (MWCNTs) which are synthesized in accordance with the process of the present disclosure.

DETAILED DESCRIPTION

The present disclosure provides a process for synthesizing a functionalized multi-walled carbon nanotube (MWCNTs), comprising: refluxing multi-walled carbon nanotubes with an acidic mixture of sulphuric acid, nitric acid and deionized water to obtain a acid functionalized multi-walled carbon nanotubes; and reacting the acid functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

An embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water, wherein the acidic mixture contains sulphuric acid:nitric acid:deionized water in a ratio range of 0.8:18:95 to 1.2:22:105, to obtain a acid functionalized multi-walled carbon nanotubes; and reacting the acid functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

Yet another embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water, wherein the acidic mixture contains sulphuric acid:nitric acid:deionized water in a ratio of 1:20:100, to obtain a acid functionalized multi-walled carbon nanotubes; and reacting the acid functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

Further an embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water for a time period in the range of 20 hours to 30 hours to obtain a acid functionalized multi-walled carbon nanotubes; and reacting the acid functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

Still, another embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water at a temperature in the range of 100 deg C. to 130 deg C. to obtain a acid functionalized multi-walled, carbon nanotubes; and reacting the acid functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

Another embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water at a temperature in the range of 100 deg C. to 130 deg C. for a time period in the range of 20 hours to 30 hours to obtain a acid functionalized multi-walled carbon nanotubes; and reacting the acid functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

An embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water to obtain a acid functionalized multi-walled carbon nanotubes; reacting the acid functionalized multi-walled carbon nanotubes with thionyl chloride ($SOCl_2$) at a temperature of 120 deg C. and in presence of N,N-dimethyl formamide (DMF) to obtain acid chloride functionalized multi-walled carbon nanotubes;

and reacting the acid chloride functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

Another embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water, wherein the acidic mixture contains sulphuric acid:nitric acid:deionized water in a ratio range of 0.8:18:95 to 1.2:22:105, to obtain a acid functionalized multi-walled, carbon nanotubes; reacting the acid functionalized multi-walled carbon nanotubes with thionyl chloride ($SOCl_2$) at a temperature of 120 deg C. and in presence of N,N-dimethyl formamide (DMF) to obtain acid chloride functionalized multi-walled carbon nanotubes; and reacting the acid chloride functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

Yet, another embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water, wherein the acidic mixture contains sulphuric acid:nitric acid:deionized water in a ratio of 1:20:100, to obtain a acid functionalized multi-walled carbon nanotubes; reacting the acid functionalized multi-walled carbon nanotubes with thionyl chloride ($SOCl_2$) at a temperature of 120 deg C. and in presence of N,N-dimethyl formamide (DMF) to obtain acid chloride functionalized multi-walled carbon nanotubes; and reacting the acid chloride functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

Still, another embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water for a time period in the range of 20 hours to 30 hours to obtain a acid functionalized multi-walled carbon nanotubes; reacting the acid functionalized multi-walled carbon nanotubes with h thionyl chloride ($SOCl_2$) at a temperature of 120 deg C. and in presence of N,N-dimethyl formamide (DMF) to obtain acid chloride functionalized multi-walled carbon nanotubes; and reacting the acid chloride functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

Further, an embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water at a temperature in the range of 100 deg C. to 130 deg C. to obtain a acid functionalized multi-walled carbon nanotubes; reacting the acid functionalized multi-walled carbon nanotubes with thionyl chloride ($SOCl_2$) at a temperature of 120 deg C. and in presence of N,N-dimethyl formamide (DMF) to obtain acid chloride functionalized multi-walled carbon nanotubes; and reacting the acid chloride functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

Another embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water at a temperature in the range of 100 deg C. to 130 deg C., for a time period in the range of 20 hours to 30 hours, to obtain a acid functionalized multi-walled carbon nanotubes; reacting the acid functionalized multi-walled carbon nanotubes with thionyl chloride ($SOCl_2$) at a temperature of 120 deg C. and in presence of N,N-dimethyl formamide (DMF) to obtain acid chloride functionalized multi-walled carbon nanotubes; and reacting the acid chloride functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

The organic solvent used in accordance with the present disclosure is selected from N,N-dimethyl formamide (DMF), N-Methyl-2-pyrrolidone (NMP), Pyridine, Dimethyl sulfoxide (DMSO), Aniline, or orthodichlorobenzene (ODCB). The organic solvent preferably used in the process of the present disclosure is N,N-dimethyl formamide (DMF).

An embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water to obtain a acid functionalized multi-walled carbon nanotubes; reacting the acid functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs); dispersing the oleylamine derivative of multi-walled carbon nanotubes (MWCNTs) in o-dichlorobenzene to obtain a dispersed solution; treating the dispersed solution with methyl 4-benzoylbutyrate p-tosylhydrazone dissolved in pyridine to obtain a reaction mixture; and adding sodium methoxide to the reaction mixture and refluxing the resultant mixture at a temperature of 120 deg C. for a time period in the range of 45 hours to 55 hours to obtain PCBM analog of multi-walled carbon nanotubes (MWCNTs).

Another embodiment of the present disclosure provides a process for synthesizing a functionalized multi-walled carbon nanotube (MWCNTs), comprising: refluxing multi-walled carbon nanotubes with an acidic mixture of sulphuric acid, nitric acid and deionized water to obtain a acid functionalized multi-walled carbon nanotubes; reacting the acid functionalized multi-walled carbon nanotubes with thionyl chloride ($SOCl_2$) at a temperature of 120 deg C. and in presence of N,N-dimethyl formamide (DMF) to obtain acid chloride functionalized multi-walled carbon nanotubes; and reacting the acid chloride functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs); dispersing the oleylamine derivative of multi-walled carbon nanotubes (MWCNTs) in o-dichlorobenzene to obtain a dispersed solution; treating the dispersed solution with methyl 4-benzoylbutyrate p-tosylhydrazone dissolved in pyridine to obtain a reaction mixture; and adding sodium methoxide to the reaction mixture and refluxing the resultant mixture at a temperature of 120 deg C. for a time period in the range of 45 hours to 55 hours to obtain PCBM analog of multi-walled carbon nanotubes (MWCNTs).

The present disclosure also provides a process for synthesizing a polycarbosilane coated multi-walled carbon nanotubes (MWCNT's), comprising: mixing polycarbosilane and multi-walled carbon nanotubes (MWCNT's) in a ratio of 1:2 to obtain a mixture; stirring the mixture in Tetrahydrofuran (THF) at a temperature in the range of 50 deg C. to 65 deg C. for a time period in the range of 6 hours to 12 hours, in presence of a catalyst under an inert atmosphere, to obtain a reaction mixture; and drying the reaction mixture under vacuum followed by heating at a temperature in the range of 430 deg C. to 460 deg C., in 0.1 mbar vacuum for a time period in the range of 4 hours to 6 hours to obtain polycarbosilane coated multi-walled carbon nanotubes (MWCNT's).

An embodiment of the present disclosure provides a process for synthesizing a polycarbosilane coated multi-walled carbon nanotubes (MWCNT's), comprising: mixing polycarbosilane and functionalized multi-walled carbon nanotubes in a ratio of 1:2 to obtain a mixture; stirring the mixture in Tetrahydrofuran (THF) at a temperature in the range of 50 deg C. to 65 deg C. for a time period in the range of 6 hours to 12 hours, in presence of a catalyst under an inert atmosphere, to obtain a reaction mixture; and drying the reaction mixture under vacuum followed by heating at a temperature in the range of 430 deg C. to 460 deg C., in 0.1 mbar vacuum for a time period in the range of 4 hours to 6 hours to obtain polycarbosilane coated multi-walled carbon nanotubes (MWCNT's).

Still, another embodiment of the present disclosure provides a process for synthesizing a polycarbosilane coated multi-walled carbon nanotubes (MWCNT's), comprising: mixing polycarbosilane and oleylamine derivative of multi-walled carbon nanotubes (MWCNTs) in a ratio of 1:2 to obtain a mixture; stirring the mixture in Tetrahydrofuran (THF) at a, temperature in the range of 50 deg C. to 65 deg C. for a time period in the range of 6 hours to 12 hours, in presence of a catalyst under an inert atmosphere, to obtain a reaction mixture; and drying the reaction mixture under vacuum followed by heating at a temperature in the range of 430 deg C. to 460 deg C., in 0.1 mbar vacuum for a time period in the range of 4 hours to 6 hours to obtain polycarbosilane coated multi-walled carbon nanotubes (MWCNT's).

Yet another embodiment of the present disclosure provides a process for synthesizing a polycarbosilane coated multi-walled carbon nanotubes (MWCNT's), comprising: mixing polycarbosilane and non-functionalized multi-walled carbon nanotubes in a ratio of 1:2 to obtain a mixture; stirring the mixture in Tetrahydrofuran (THF) at a temperature in the range of 50 deg C. to 65 deg C. for a time period in the range of 6 hours to 12 hours, in presence of a catalyst under an inert atmosphere, to obtain a reaction mixture; and drying the reaction mixture under vacuum followed by heating at a temperature in the range of 430 deg C. to 460 deg C., in 0.1 mbar vacuum for a time period in the range of 4 hours to 6 hours to obtain polycarbosilane coated multi-walled carbon nanotubes (MWCNT's).

Further, an embodiment of the present disclosure provides a process for synthesizing a polycarbosilane coated multi-walled carbon nanotubes (MWCNT's), comprising: mixing polycarbosilane and multi-walled carbon nanotubes (MWCNT's) in a ratio of 1:2 to obtain a mixture; stirring the mixture in Tetrahydrofuran (THF) at a temperature in the range of 50 deg C. to 65 deg C. for a time period in the range of 6 hours to 12 hours, in presence of Speier's catalyst ($H_2PtCl_6$) under an inert atmosphere, to obtain a reaction mixture; and drying the reaction mixture under vacuum followed by heating at a temperature in the range of 430 deg C. to 460 deg C., in 0.1 mbar vacuum for a time period in the range of 4 hours to 6 hours to obtain polycarbosilane coated multi-walled carbon nanotubes (MWCNT's).

Still, an embodiment of the present disclosure provides a process for synthesizing a polycarbosilane coated multi-walled carbon nanotubes (MWCNT's), comprising: mixing polycarbosilane and multi-walled carbon nanotubes (MWCNT's) in a ratio of 1:2 to obtain a mixture; stirring the mixture in Tetrahydrofuran (THF) at a temperature in the range of 50 deg C. to 65 deg C. for a time period in the range of 6 hours to 12 hours, in presence of a catalyst under an inert atmosphere, to obtain a reaction mixture; and drying the reaction mixture under vacuum followed by heating at a temperature of 450 deg C., in 0.1 mbar vacuum for a time period in the range of 4 hours to 6 hours to obtain polycarbosilane coated multi-walled carbon nanotubes (MWCNT's).

Yet another embodiment of the present disclosure provides a process for synthesizing a polycarbosilane coated multi-walled carbon nanotubes (MWCNT's), comprising: mixing polycarbosilane and multi-walled carbon nanotubes (MWCNT's) in a ratio of 1:2 to obtain a mixture; stirring the mixture in Tetrahydrofuran (THF) at a temperature in the range of 50 deg C. to 65 deg C. for a time period in the range of 6 hours to 12 hours, in presence of a catalyst under an inert atmosphere, to obtain a reaction mixture; and drying the reaction mixture under vacuum followed by heating at a temperature in the range of 430 deg C. to 460 deg C., in 0.1 mbar vacuum for 5 hours to obtain polycarbosilane coated multi-walled carbon nanotubes (MWCNT's).

An embodiment of the present disclosure provides a process for synthesizing a polycarbosilane coated multi-walled carbon nanotubes (MWCNT's), comprising: mixing polycarbosilane and oleylamine derivative of multi-walled carbon nanotubes (MWCNTs) in a ratio of 1:2 to obtain a mixture; stirring the mixture in Tetrahydrofuran (THF) at a temperature in the range of 50 deg C. to 65 deg C. for a time period in the range of 6 hours to 12 hours, in presence of a catalyst under an inert atmosphere, to obtain a reaction mixture; and drying the reaction mixture under vacuum followed by heating at a temperature of 450 deg C., in 0.1 mbar vacuum for 5 hours to obtain polycarbosilane coated multi-walled carbon nanotubes (MWCNT's).

The present disclosure further provides that the functionalized multi-walled carbon nanotubes as synthesized in accordance with the process of the present disclosure are used in making photovoltaic devices.

The present disclosure also provides that the polycarbosilane coated multi-walled carbon nanotubes as synthesized in accordance with the process of the present disclosure are used in making glass fiber reinforced epoxy composites.

In an embodiment of the present disclosure for making oleyl amine derivative of MWCNTs, in the first step the CCVD grown MWCNTs are purified by refluxing with chloroform from 6 to 10 hours, preferably 8 hours in normal atmospheric condition. The purified MWCNTs are dried in a vacuum oven for 20 to 30 hours, preferably for 24 hours and characterized by Fourier Transformed-Infra Red (FT-IR), Raman and Thermo Gravimetric Analysis (TGA) studies. The dried MWCNTs are refluxed with 0.8 to 1.2:18 to 22:95 to 105, preferably at 1:20:100 ratio of sulphuric acid:nitric acid:deionized water for 20 to 30 hours, preferably 24 hours for 100 deg C. to 130 deg C., preferably for 120 deg C. The acid functionalized MWCNTs are filtered through course filter paper, washed with alcohol and dried in vacuum for 5 to 7 hours, preferably 6 hours. FT-IR, Raman and TGA studies revealed that the acid functional groups are introduced onto the nanotube surface.

Since in the process of the present disclosure the very dilute acid is used to obtained acid functionalized multi-walled carbon nanotubes, the structure of MWCNT is not damage at 120 deg C. heating and a very few —COOH groups will introduced on the MWCNTs surface.

Oleyl amine derivative of MWCNTs are prepared by two methods. In the first method, the acid functionalized MWCNTs are directly refluxed at 100 deg C. to 135 deg C., preferably at 120 deg C. with 1:30 weight percentage of oleyl amine in N,N-dimethyl formamide for 4 to 6 days, preferably for 5 days. In another method, the acid functionalized MWCNTs are first converted to acid chloride by reacting with $SOCl_2$ followed by the derivatization of oleyl amine at 120 deg C. in N,N-dimethyl formamide for 3 days. The oleyl amine derivative of MWCNTs are filtered through course filter paper, washed with N,N-dimethyl formamide and dried in vacuum for 5 to 7 hours, preferably 6 hours. FT-IR, Raman, TGA and XPS characterization techniques are used for ascertain the formation of amide functional groups on the surface of MWCNTs.

The boiling point of the organic solvents used in the process of the present disclosure is about 150 deg C., so the combined boiling point of the solvent and oleylamine has been drastically reduced. At 120 deg C., oleyl amine group is therefore covalently attached to MWCNT in much lesser time (72 hours as compared to 120 hours reported in literature where no organic solvent is used with oleyl amine to reduce the overall boiling point of the solvent).

In an embodiment of the present disclosure the Fullerene (PCBM) analog of MWCNTs is synthesized by methyl 4-benzoylbutyrate using a carbene intermediate reaction. The well dispersed oleyl amine derivative of the MWCNTs enables organic solution-phase-chemistry with the carbene precursor. The first step is the preparation of the carbene Precursor, methyl 4-benzoylbutyrate p-tosylhdrazone, which produced a stable diazo compound in situ during the reaction followed by the generation of a carbene intermediate. For the synthesis of methyl 4-benzoylbutyrate p-tosylhydrazone; 4-benzoylbutyric acid, methanol, benzene, p-toluenesulfonic acid are added together in the proportion of 3.5 to 4 gm: 15 to 20 mL: 8 to 12 mL: 0.55 to 0.6 gm, preferably at 3.8 gm: 16 mL:10 mL:0.57 gm and the resultant solution is refluxed for 15 to 20 hours, preferably for 18 hours. The reaction mixture is then allowed to cool and 40 mL of ethyl acetate is added. The resultant mixture is washed with 10% $Na_2CO_3$ solution (30 mL*3). The separated organic phase is dried with anhydrous magnesium sulfate and dried in vacuum for 24 hours to get methyl 4-benzoylbutyrate as yellow oil.

In the next step, Methyl 4-benzoylbutyrate is mixed with p-toluenesulfonyl hydrazide in the ratio of 2 to 2.5 gm:2.1 to 2.6 gm, preferably at 2.15 gm:2.33 gm in presence of 10 mL of methanol and refluxed for 5 to 8 hours, preferably for 6 hours. The mixture is left distributed at 15 deg C. to 25 deg C., preferably at 20 deg C. for 24 hour and then poured onto the ices mixed with NaCl. The product is collected by filtration, washed with a little cold methanol and dried in the vacuum oven at 50 deg C. to yield the whitish colour methyl 4-benzoylbutyrate p-tosylhdrazone crystals. For the PCBM analog of MWCNTs; 45 to 55 mg, preferably 50 mg of oleyl amine derivative of MWCNT which is dispersed in 200 to 300 mL, preferably 250 mL of o-dichlorobenzene is treated with 450 mg to 550 mg, preferably 500 mg of methyl 4-benzoylbutyrate p-tosylhydrazone which is dissolved in 100 to 200 mL, preferably 150 mL of pyridine. The mixture is stirred for 15 minutes and 5 to 7 gm, preferably 6 gm of sodium methoxide was added to the mixture followed by refluxing at 120 deg C. for 45 to 55 hours, preferably for 48 hours under inert atmosphere. The reaction mixture is filtered through coarse filter paper. The black coloured residue is washed with dichlorobenzene, chloroform and alcohol followed by drying under vacuum at 70 deg C. to 90 deg C., preferably at 80 deg C. for 24 hours.

Methyl 4-benzoylbutyrate p-tosylhydrazone derivatives of fullerenes (PCBM) are well known for stability, solubility and for their excellent electrical and optical properties. However, the methyl 4-benzoylbutrate p-tosylhydrazone derivative of MWCNT was not tried earlier due to the problem of dispersion of MWCNTs in organic solvent. The functionalized MWCNTs synthesized by the process of the present disclosure have solved this dispersion problem.

In an embodiment of the present disclosure for the synthesis of PCS coated MWCNTs or oleyl amine derivative of MWCNTs, Polycarbosilane (PCS) are coated on the surface of MWCNTs or oleyl amine derivative of MWCNTs without using any harsh chemical condition like strong inorganic acid or base. The thickness of coating directly depends upon the ratio of PCS and MWCNTs. The higher the thickness of PCS on MWCNTs, higher is the dispersion of PCS coated MWCNTs in organic solvent, however, the higher thickness does not lead to good enhancement of mechanical properties of epoxy resin. It is optimized in the process of the present disclosure that the ratio of 1:2 to 1:4 of PCS with MWCNTs gives best reinforcement results. For coating of PCS on MWCNTs, different ratios are stirred in THF at 50 deg C. for 06 hours in the presence of a catalyst under inert atmosphere. The reaction mixture is dried under vacuum in a rotary evaporator and then heated at 430° C.-460° C., preferably at 450° C. in 0.1 mbar vacuum for 4 to 6 hours, preferably for 5 hours to stabilized the PCS coating of PCS on the surface of MWCNTs.

In an embodiment of the present disclosure for making the glass fabric based epoxy, HUNTSMAN make araldite impregnating resin system consisting of Araldite MY 740 (epoxy resin content 5.25.5 equivalent/kg), Aradur HY 918 (liquid anhydride hardener) and Accelerator DY 062 (liquid tertiary amine) in the ratio of 100:85:2.5 is used. 600 mg of MWCNTs or functionalized MWCNTs are first dispersed in 100 mL THF and mixed with 120 gm of epoxy resin using probe sonication at 40 deg C. to 60 deg C., preferably at 50 deg C. followed by high speed shear mixing in a homogenizer until the mixture become homogeneous. 102 gm of hardener and 03 gm of accelerator are then added to the mixture and again sonicated followed by shear mixing for 10 to 20 minutes, preferably for 15 minutes. These nanotube modified resins are then used to laminate the glass fabrics via the hand lay up/wet lay up method. The 250 mm*250 mm*0.25 mm of the eighteen glass fabric sheets were stacked together by compression molding at 80 deg C. to 120 deg C., preferably at 100 deg C. with 100 kg/cm$^2$-200 kg/cm$^2$, preferably 150 kg/cm$^2$ of pressure for 1 to 3 hours, preferably for 2 hours, followed by post curing in a forced air circulation oven at 100 deg C. to 150 deg C., preferably at 120 deg C. for 1 hour to 3 hours, preferably for 2 hours. The glass fiber reinforced composites are cooled down to ambient temperature and then taken out of the oven. The composites are evaluated for mechanical endurance like tensile, impact, flexural and interlaminar shear strength as per ASTM standard.

In an embodiment of the present disclosure for photovoltaic device fabrication regio regular poly 3 hexyl thiophene (rr-P3HT) nanofibres is mixed with 0.25 to 1.5 weight percentage, preferably at 1 weight percentage of oleyl amine derivative and PCBM analog of MWCNTs. The photoactive layer is spin cast on pre-cleaned ITO substrate at 10000 rpm and the film is annealed at 100 to 120 deg C., preferably 80 deg C. in 10$^{-5}$ torr vacuum for 20 to 40 minutes, preferably for 30 minutes. Top layer of aluminum of 80-150 nm, preferably 100 mm thickness is thermally deposited. Finally, an ITO/rr-P3HT nanofibres-functionalized MWCNT/Al bulk-hetero-junction solar, devices are formed in which ITO material on glass substrate and aluminum top layer work as electrodes for making electrical connections. The fabricated devices were characterized for short circuit dark current and photo current using 1.5 A.M solar simulator and the photovoltaic characteristic.

The main advantage of the process of the present disclosure is that the functionalized multi-walled carbon nanotubes synthesized by the process of the present disclosure are covalent functionalized MWCNTs. The surface of the covalent functionalized MWCNTs synthesized by the process of the present disclosure, are tailor made in such a way that the individual nanotube is not agglomerated and well distributed in the host matrix. The process of the present disclosure is a simple method for side wall functionalization of MWCNTs with oleyl amine. Oleyl amine is a well known capping agent to stop agglomeration of nanomaterials. The oleyl amine is covalently attached on the side walls of MWCNTs to achieve the easy dispersion of oleyl amine derivatives of MWCNTs in the host resin matrix. The long chain length of oleyl amine not only helps to stop the agglomeration of nanotubes but also works as a spacer group to transfer load in fiber reinforced composites. Tailoring the surface of MWCNTs by the use of oleyl amine helps the MWCNTs derivative to disperse in the organic solvents for several days whereas the as grown MWCNTs settled down in the organic solvent within few minutes. FT-IR, Raman, XPS and thermogravimetric analysis techniques were used to ascertain that the oleyl amine groups were covalently attached with the MWCNTs surface.

As the oleyl amine derivatives of MWCNTs synthesized by the process of the present disclosure are excellently dispersed in organic solvent, therefore, the methyl 4-benzoylbutyrate p-tosylhydrazone derivative of MWCNTs is carried out and the PCBM analog of MWCNTs not only showed good dispersion in the host matrix, but also exhibit good photocurrents in the photovoltaic devices. Finally, FT-IR, Raman and thermogravimetric analysis characterization techniques were used to confirm that the PCBM analog of MWCNTs were actually formed.

The coating of MWCNTs or oleyl amine derivatives of MWCNTs by polycarbosilane (PCS) in accordance with the present disclosure are carried out using a simple solvent coating technique by a soft chemical method followed by stabilization of this coating on the MWCNTs surface by vacuum annealing. Silanes are generally used for making the glass fabrics more interactive with epoxy matrix. The PCS coating on the MWCNTs surface not only help the MWCNTs to disperse in the organic solvent but also acts as an supporting layer to enhance the interaction with the glass fabric which in turn enhance the mechanical strength of the composite. FT-IR, Raman and thermogravimetric analysis have been carried out to show that the MWCNTs surface in coated by polycarbosilane.

The glass fabric based epoxy composites are prepared by sandwiching the eighteen glass fabric sheets with the modified epoxy resins by the prepared functionalized MWCNTs synthesized by the process of the present disclosure. The percolation threshold of nanotubes for epoxy matrix is generally low, therefore different low weight percentages loading of the functionalized MWCNTs was carried out to ascertain the enhancement of mechanical strength and the interactions of the interfaces in the composites.

The primary reason of the low efficiency of the organic photovoltaics is the low carrier mobility of the organic layer, the addition of CNTs in the conducting polymer layer has been reported to enhance the magnitude of the charge mobility by several orders of magnitude. However, the problem of CNTs is the dispersion in organic solvent, so that highly folded phase segregated structure could not manufactured. The highly soluble oleyl amine and the PCBM analog of oleyl amine functionalized MWCNT with excellent electrical and optical properties showed well ordered bulk heterojunction morphology which in turn increases the photocurrent of the organic photovoltaics.

EXAMPLES

The disclosure will now be illustrated with working examples, which is intended to illustrate the working of disclosure and not intended to take restrictively to imply any limitations on the scope of the present disclosure. Other examples are also possible which are within the scope of the present disclosure.

Example 1

Preparation of Acid Functionalized Multi-Walled Carbon Nanotubes (MWCNTs)

For making oleyl amine derivative of multi-walled carbon nano-tubes (MWCNTs), in the first step the CCVD grown MWCNTs were purified by refluxing with chloroform for 8 hours in normal atmospheric condition. The purified MWCNTs were dried in a vacuum oven for 24 hours and characterized by Fourier Transformed-Infra Red (FT-IR), Raman and Thermo Gravimetric Analysis (TGA) studies.

FTIR (KBr): 1625 cm$^{-1}$ (—C=C—);

Raman (by 514 nm laser): 1338 cm$^{-1}$ [Detect band (D band)], 1594 cm$^{-1}$ [Grapheme band (G band)] and ratio of D band:G band is 0.717;

TGA (nitrogen atmosphere): 870° C. (decomposition onset)

The dried MWCNTs were refluxed with 1:20:100 ratio of sulphuric acid:nitric acid:deionized water for 24 hours for 120 deg C. The acid functionalized MWCNTs were filtered through course filter paper, washed with alcohol and dried in vacuum for 6 hours. FT-IR, Raman and TGA studies revealed that the acid functional groups are introduced onto the nanotube surface.

FTIR (KBr): 2924 cm$^{-1}$ (—CH, aromatic), 1658 cm$^{-1}$ (—C=C—, 1099 cm$^{-1}$ (—C—O, stretching), 3440 cm$^{-1}$ (—OH, stretching);

Raman (by 514 nm laser): 1352 cm$^{-1}$ (D band), 1600 cm$^{-1}$ (G band) and ratio of D band:G band is 1.08;

TGA (nitrogen atmosphere): 720 deg C. (decomposition onset)

Example 2

Preparation of Oleyl Amine Derivatives of MWCNTs

The acid functionalized MWCNTs, as prepared in example 1, were directly refluxed at 120 deg C. with 1:30 weight percentage of oleyl amine in N,N-dimethyl formamide for 5 days. The oleyl amine derivative of MWCNTs were filtered through course filter paper, washed with N,N-dimethyl formamide and dried in vacuum for 6 hours. FT-IR, Raman and TGA characterization techniques were used for ascertain the formation of amide functional groups on the surface of MWCNTs.

FTIR (KBr): 2921 cm$^{-1}$ (—CH, aromatic), 1634 cm$^{-1}$ (—C=C—), 1020 cm$^{-1}$ (—C—N), 3432 cm$^{-1}$ (—NH);

Raman (by 514 nm laser): 1351 cm$^{-1}$ (D band), 1587 cm$^{-1}$ (G band) and ratio of D band:G band is 0.95;

TGA (nitrogen atmosphere): 325° C.; 488° C., 728° C. (decomposition onsets)

Example 3

Preparation of Oleyl Amine Derivatives of MWCNTs

The acid functionalized MWCNTs as prepared in example 1, were first converted to acid chloride by reacting with SOCl$_2$ followed by the derivatization of Oleyl amine at 120° C. in N,N-dimethyl formamide for 3 days. The oleyl amine derivative of MWCNTs were filtered through course filter paper, washed with N,N-dimethyl formamide and dried in vacuum for 6 hours. FT-IR, Raman and TGA characterization techniques were used for ascertain the formation of amide functional groups on the surface of MWCNTs.

FTIR (KBr): 2921 cm$^{-1}$ (—CH, aromatic), 1634 cm$^{-1}$ (—C=C—), 1020 cm$^{-1}$ (—C—N), 3432 cm$^{-1}$ (—NH);

Raman (by 514 nm laser): 1351 cm$^{-1}$ (D band), 1587 cm$^{-1}$ (G band) and ratio of D band:G band is 0.95;

TGA (nitrogen atmosphere): 325° C.; 488° C., 728° C. (decomposition onsets)

Example 4

The X-Ray Photoelectron Spectroscopy (XPS) of the Oleylamine Derivative of MWCNTs prepared in the example 2 and 3 was conducted to ascertain the percentage of conversion or Functionalization of MWCNTs.

For XPS, the MWCNT and functionalized MWCNTs powder samples were deposited on a double sided carbon conducting additive tape and the samples were placed on a Perkin Elmer PHI 1257 X-ray Photo Electron Spectrometer. C-1S and N-1S core level spectra were recorded using different sputtering time with the following experimental conditions:

1) Al-Kα source (15 kV, 350 w)
2) Take off angle 45° and pass energy 187.85 ev for survey analysis (150-1100 eV)
3) Take off angle 45° and pass energy 58.7 ev for C-1S & N-1S analysis.
    For C-1S (280-292 eV)
    For N-1S (395-410 eV)

Argon ion sputtering:
i) Incident ion gun operated at 3.5 KeV
ii) Sample current at 5.5 μA across the sample area.
iii) Sputtering time 0 min, 1 min, 5 min & 10 min for C-1S & N-1S analysis The X-ray photoelectron spectrograph obtained is shown in FIG. 1. The black coloured thin line is the actual XPS spectra and red coloured line is the fitted line (error is ±2%)).

The data of the XPS were imported to OriginPro8 software and plotted where binding energy in X axis and counts in Y axis. The baseline of the curve was then corrected and the curve was smoothed by adjacent averaging method using 25 points of window. The smoothed curve was then subjected to Lorentzian multipeaks curve fitting using OriginPro8 multi peaks fitting software. The area under the desired fitted peaks in the curve was used to calculate the percentage conversion of MWCNT.

The peak at 284.6 e.v. is for carbon nanotube and the black coloured thick line is the lorenzian curve fitting data of CNT. The peak at 287.4 e.v. is for oleylamine functionalized MWCNTs and the area under the blue coloured peak is the lorenzian curve fitting data of oleylamine functionalized MWCNT and this indicates that the percentage conversion is around ~4.6%.

Example 5

Preparation of Methyl 4-Benzoylbutyrate p-Tosylhydrazone 4-benzoylbutyric acid, methanol, benzene, p-toluenesulfonic acid were added together in the proportion of 3.8 gm:16 mL:10 mL:0.57 gm and the resultant solution was refluxed for 18 hours. The reaction mixture was then allowed to cool and 40 mL of ethyl acetate was added. The resultant mixture was washed with 100% Na$_2$CO$_3$ solution (30 mL*3). The separated organic phase was dried with anhydrous magnesium sulfate and dried in vacuum for 24 hours to get methyl 4-benzoylbutyrate as yellow oil.

Methyl 4-benzoylbutyrate was mixed with p-toluenesulfonyl hydrazide in the ratio of 2.15 gm:2.33 gm in presence of 10 mL of methanol and refluxed for 6 hours. The mixture was left distributed at 20 deg C. for 24 hours and then poured onto the ices mixed with NaCl. The product was collected by filtration, washed with a little cold methanol and dried in the vacuum oven at 50 deg C. to yield the whitish colour methyl 4-benzoylbutyrate p-tosylhdrazone crystals. The methyl 4-benzoylbutyrate p-tosylhydrazone was characterized by measuring melting point, FT-IR, FT-NMR.

Melting Point: 123° C.

Proton NMR (CDCl$_3$): 9.3 (—NH), 7.9 (ortho HArSO$_2$—), 7.6 (ortho HPh), 7.3 meta HArSO$_2$), 3.8 (—OCH3), 2.6 (N=CCH$_2$—), 2.4 (ArCH$_3$), 2.3 (—CH$_2$CO$_2$R), 1.7 (—CH$_2$CH$_2$CO$_2$R)

FTIR (KBr): 3112 cm$^{-1}$ (—CH, aromatic), 1736 cm$^{-1}$ (—COOR), 1597 cm$^{-1}$ (—C=C—), 1320 cm$^{-1}$ (—C—O—).

Example 6

Preparation of Fullerene (PCBM) Analog of Multi-Walled Carbon Nanotubes (MWCNTs)

50 mg of oleyl amine derivative of MWCNT which was dispersed in 250 mL of o-dichlorobenzene mixture was treated with 500 mg of methyl 4-benzoylbutyrate p-tosylhydrazone which was dissolved in 150 mL of pyridine. The mixture was stirred for 15 minutes and 6 gm of sodium methoxide was added to the mixture followed by refluxing at 120 deg C. for 48 hours under inert atmosphere. The reaction mixture was filtered through coarse filter paper. The black coloured residue was washed with dichlorobenzene, chloroform and alcohol followed by drying under vacuum at 80 deg C. for 24 hours. FT-IR, Raman, and TGA characterization techniques were used for ascertain the formation of PCBM analog of MWCNTs.

FTIR (KBr): 2920 cm$^{-1}$ (—CH, aromatic), 1597 cm$^{-1}$ (—C=C—), 1080 cm$^{-1}$ (—C—N). 3420 cm$^{-1}$ (—NH), 1357 cm$^{-1}$ (—C—C—, aliphatic), 1491 cm$^{-1}$ (—C—C—, aromatic);

Raman (by 514 nm laser): 1350 cm$^{-1}$ (D band), 1577 cm$^{-1}$ (G band) and ratio of D band:G band is 0.99;

TGA (nitrogen atmosphere): 360° C., 460° C.; 510° C. (decomposition onsets)

Example 7

Preparation of Polycarbosilane (PCS) Coated Multi-Walled Carbon Nanotubes (MWCNTs)

For coating of PCS on MWCNTs, 200 mg MWCNTs and 100 mg of PCS were stirred in 100 mL of THF at 50° C. for 6 hours in the presence of a catalyst (Speier's catalyst) under inert atmosphere. The reaction mixture was dried under vacuum in a rotary evaporator and then heated at 450 deg C. in 0.1 mbar vacuum for 5 hours to stabilize the PCS coating of PCS on the surface of MWCNTs.

FTIR (KBr): 2957 cm$^{-1}$ & 2900 cm$^{-1}$ (—CH), 2112 cm$^{-1}$ (—Si—H), 1654 cm$^{-1}$ (—C=C—), 1258 cm$^{-1}$ (—Si—CH$_3$ (1023 cm$^{-1}$ (—Si—CH$_2$—Si);

Raman (by 514 nm laser): 1330 cm$^{-1}$ (D band) 1587 cm$^{-1}$ (G band) and ratio of D band:G band is 0.722;

TGA (nitrogen atmosphere): 1400 deg C. (decomposition onsets)

The higher thickness of PCS on MWCNTs does not lead to good enhancement of mechanical properties of epoxy resin as shown below in Table 1:

TABLE 1

| MWCNTs | PCS | Epoxy (LY 556) Harder (HY 951) | CNT-Epoxy (1 weight %) | PCS coated CNT-Epoxy (1 weight %) | Percentage enhancement |
|---|---|---|---|---|---|
| 2 gm | 2 gm | 77 MPa | 78 MPa | 78 MPa | 1.3 |
| 2 gm | 1 gm | 77 MPa | 78 MPa | 80 MPa | 3.9 |
| 2 gm | 0.5 gm | 77 MPa | 78 MPa | 80 MPa | 3.9 |

It was therefore, concluded that 1:2 to 1:4 ratio of PCS with MWCNTs gives best reinforcement results.

Example 8

Preparation of Glass Fabric Based Epoxy

For making the glass fabric based epoxy, HUNTSMAN make araldite impregnating resin system which is consisting of Araldite MY 740 (epoxy resin content 5.25.5 equivalent/kg), Aradur HY 918 (liquid anhydride hardener) and Accelerator DY 062 (liquid tertiary amine) in the ratio of 100:85:2.5 was used. 600 mg of MWCNTs or functionalized MWCNTs were first dispersed in 100 mL THF and mixed with 120 gm of epoxy resin using probe sonication at 50 deg C. followed by high speed shear mixing in a homogenizer until the mixture become homogeneous. 102 gm of hardener and 03 gm of accelerator were then added to the mixture and again sonicated followed by shear mixing for 15 minutes. These nanotube modified resins were then used to laminate the glass fabrics via the hand lay up/wet lay up method. The 250 mm×250 cm×0.25 mm of the eighteen glass fabric sheets were stacked together by compression molding at 100 deg C. with 150 kg/cm$^2$ of pressure for 2 hours, followed by post curing in a forced air circulation oven at 120 deg C. for 2 hours. The glass fiber reinforced composites were cooled down to ambient temperature (25 deg C.) and then taken out of the oven. The composites were evaluated for mechanical endurance like tensile, impact, flexural and interlaminar shear strength as per ASTM standard.

Example 9

Preparation of Photovoltaic Devices

For photovoltaic device fabrication region regular poly 3 hexyl thiophene (rr-P3HT) nanofibres were mixed with 1 weight percentage of oleyl amine derivative and PCBM analog of MWCNTs. The photoactive layer was spin cast on pre-cleaned ITO substrate at 10000 rpm and the film was annealed at 80 deg C. in 10$^{-5}$ torr vacuum for 30 minutes. Top layer of aluminum of 100 mm thickness was thermally deposited. Finally, an ITO/rr-P3HT nanofibres-functionalized MWCNT/Al bulk-hetero-junction solar devices were formed in which ITO material on glass substrate and aluminum top layer work as electrodes for making electrical connections. The fabricated devices, where the active area was 10 cm×10 cm, were characterized for short circuit dark current and photo current using 1.5 A.M solar simulator and the photovoltaic characteristic is shown below in Table 2.

TABLE 2

| | ITO/rr-P3HT nanofibres-MWCNTs (100:1)/Al | ITO/rr-P3HT nanofibres- amine functionalized MWCNTs (100:1)/Al | ITO/rr-P3HT nanofibres-PCBM analog of MWCNTs (100:1)/Al |
|---|---|---|---|
| Dark Current | 1 mA | 1.12 mA | 1.22 mA |
| Photo Current | 6 mA | 10 mA | 11.8 mA |
| Increment | 500% | 792.85% | 867.21% |
| Open circuit voltage | 0.55 V | 0.59 V | 0.61 V |

Example 10

Mechanical Test Results:

The mechanical properties like Tensile Strength (TS), Tensile Modulus (TM), Flexural. Strength (FS), Flexural Modulus (FM), Interlaminar Shear strength (ILSS), and Impact Strength (IS) of glass fiber reinforced epoxy composites made up of functionalized multi-walled carbon nanotubes (MWCNTs) or polycarbosilane (PCS) coated multi-walled carbon nanotubes (MWCNTs) were assessed.

The mechanical testing was carried out using the American Society for Testing Materials (ASTM) standard. For tensile strength and tensile modulus, the ASTM D638 standard was used whereas for flexural strength and flexural modulus ASTM D790 standard was followed. For Interlaminar Shear strength ASTM D-2344-76 standard was followed whereas for Impact strength ASTM D256v standard was used.

The results obtained are shown below in Table 3:

TABLE 3

| | | 0.5% | | | | 1.0% | | | |
|---|---|---|---|---|---|---|---|---|---|
| Property | Control | As CNT | PCS CNT | PCS amine CNT | Oleylamine CNT | As CNT | PCS CNT | PCS amine CNT | Oleylamine CNT |
| TS | 390 | 402 | 436 | 485 | 477 | 413 | 443 | 517 | 485 |
| TM | 7 | 7.44 | 7.73 | 7.61 | 7.55 | 7.86 | 7.93 | 8.09 | 7.99 |
| FS | 765 | 728 | 708 | 848 | 828 | 459 | 510 | 634 | 572 |
| FM | 34.08 | 31.19 | 31.91 | 37.91 | 37.01 | 29.80 | 29.99 | 35.05 | 33.94 |
| ILSS | 50 | 42 | 45 | 55 | 51 | 38 | 30 | 50.8 | 49.98 |
| IS | 122 | 134.16 | 144.39 | 161.23 | 158.51 | 120.74 | 129.95 | 148.59 | 142.28 |

Although the subject matter has been described in considerable detail with reference to certain preferred embodiments thereof, other embodiments are possible. As such, the spirit and scope of the appended claims should not be limited to the description of the preferred embodiment contained therein.

We claim:

1. A process for synthesizing functionalized multi-walled carbon nanotubes (MWCNTs), comprising:
    refluxing multi-walled carbon nanotubes with an acidic mixture of sulphuric acid, nitric acid and deionized water to obtain an acid functionalized multi-walled carbon nanotubes, wherein sulphuric acid, nitric acid, and deionized water are present in the acidic mixture in a ratio range from 0.8:18:95 to 1.2:22:105; and
    reacting the acid functionalized multi-walled carbon nanotubes with oleyl amine in a weight ratio of 1:30 at a temperature in the range of 100 deg C. to 135 deg C. for a time period in the range of 72 to 144 hours in presence of an organic solvent to obtain an oleylamine derivative of multi-walled carbon nanotubes (MWCNTs).

2. The process as claimed in claim 1, wherein the acidic mixture contains sulphuric acid:nitric acid:deionized water in a ratio of 1:20:100.

3. The process a claimed in claim 1, wherein the multi-walled carbon nanotubes are refluxed with the acidic mixture for a time period in the range of 20 hours to 30 hours.

4. The process as claimed in claim 1, wherein the multi-walled carbon nanotubes are refluxed with the acidic mixture at a temperature in the range of 100 deg to 130 deg C.

5. The process as claimed in claim 1, wherein the organic solvent is N,N-dimethyl formamide (DMF), N-Methyl-2-pyrrolidone (NMP), Pyridine, Dimethyl sulfoxide (DMSO), Aniline, or orthodichlorobenzene (ODCB).

6. The process as claimed in claim 1, wherein the acid functionalized multi-walled carbon nanotubes are reacted with thionyl chloride ($SOCl_2$) at a temperature of 120 deg C. and in presence of N,N-dimethyl formamide (DMF) to obtain acid chloride functionalized multi-walled carbon nanotubes.

7. The process as claimed in claim 1, further comprising:
    dispersing the oleylamine derivative of multi-walled carbon nanotubes (MWCNTs) in o-dichlorobenzene to obtain a dispersed solution;
    treating the dispersed solution with methyl 4-benzoylbutyrate p-tosylhydrazone dissolved in pyridine to obtain a reaction mixture; and
    adding sodium methoxide to the reaction mixture and refluxing the resultant mixture at a temperature of 120 deg C. for a time period in the range of 45 hours to 55 hours to obtain PCBM analog of multi-walled carbon nanotubes (MWCNTs).

8. A process for synthesizing a polycarbosilane coated multi-walled carbon nanotubes (MWCNT's), comprising:
    mixing polycarbosilane and multi-walled carbon nanotubes (MWCNT's) in a ratio range of 1:2 to 1:4 to obtain a mixture;
    stirring the mixture in Tetrahydrofuran (THF) at a temperature in the range of 50 deg C. to 65 deg C. for a time period in the range of 6 hours to 12 hours, in presence of a catalyst under an inert atmosphere, to obtain a reaction mixture; and
    drying the reaction mixture under vacuum followed by heating at a temperature in the range of 430 deg C. to 460 deg C., in 0.1 mbar vacuum for a time period in the range of 4 hours to 6 hours to obtain polycarbosilane coated multi-walled carbon nanotubes (MWCNT's),
    wherein the multi-walled carbon nanotubes (MWCNT's) are covalently functionalized multi-walled carbon nanotubes.

9. The process as claimed in claim 8, wherein the functionalized multi-walled carbon nanotubes is oleylamine derivative of multi-walled carbon nanotubes (MWCNTs).

10. The process as claimed in claim 8, wherein the catalyst is Speier's catalyst ($H_2PtCl_6$).

11. The process as claimed in claim 8, wherein the heating is done at a temperature of 450 deg C.

12. The process as claimed in claim 8, wherein the heating is done for 5 hours.

* * * * *